Figure 6:
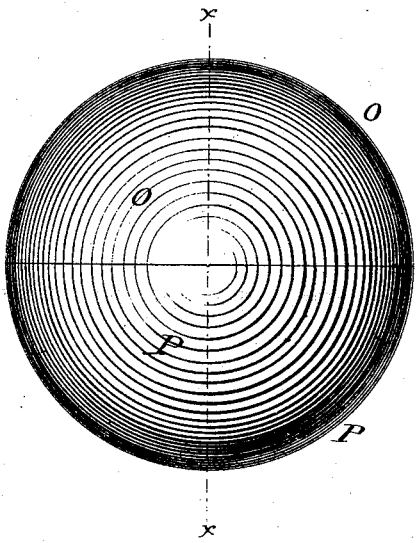

J. ARKELL.
Globe and Machinery and Process for Making the Same
No. 221,013.                    Patented Oct. 28, 1879.
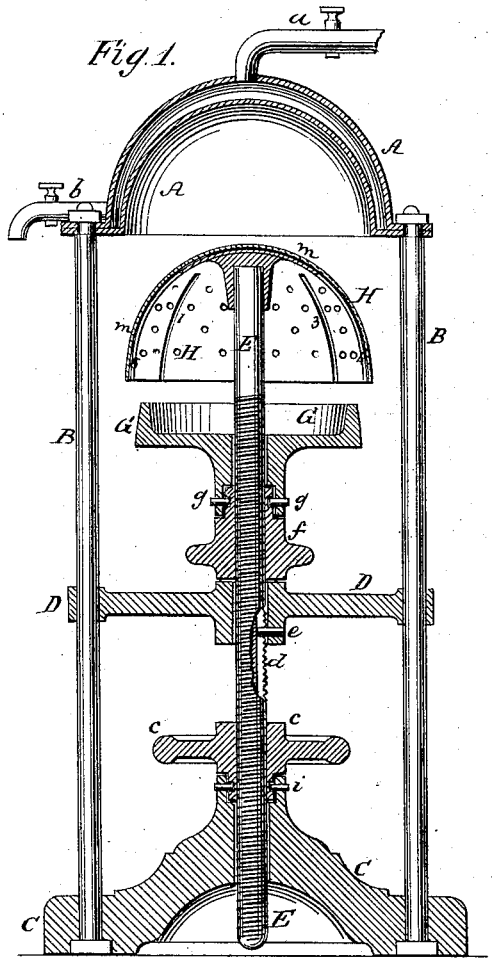
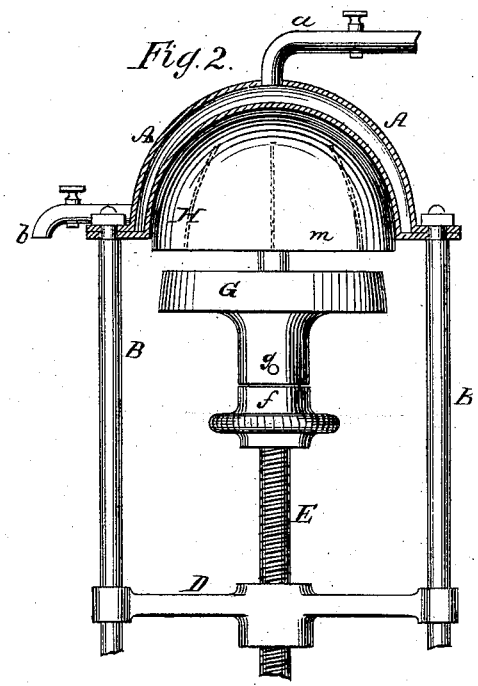
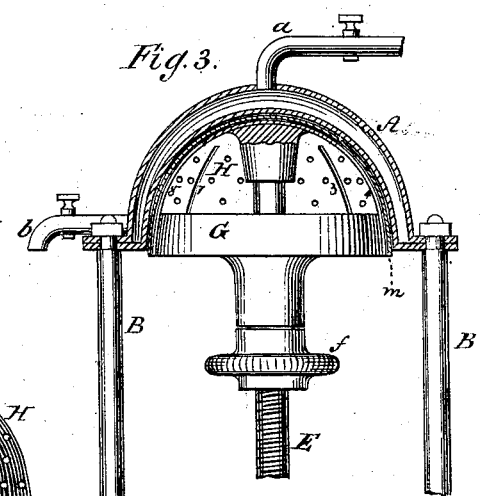
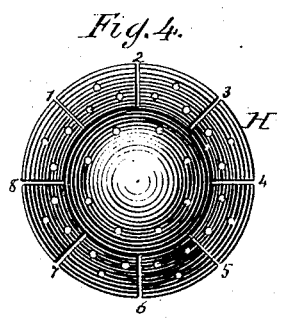
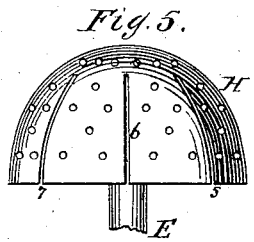
Witnesses:
E. Wolff
Jacob Felbel
Inventor:
James Arkell
By attorney
J. N. McIntire 2 Sheets—Sheet 2.

J. ARKELL.
Globe and Machinery and Process for Making the Same.

No. 221,013. Patented Oct. 28, 1879.

Witnesses:
E. Wolff.
Jacob Felbel

Inventor:
James Arkell
By attorney
J. N. McIntire

UNITED STATES PATENT OFFICE.

JAMES ARKELL, OF CANAJOHARIE, NEW YORK, ASSIGNOR TO JUVET & CO., OF SAME PLACE.

IMPROVEMENT IN GLOBES AND MACHINERY AND PROCESSES FOR MAKING THE SAME.

Specification forming part of Letters Patent No. 221,013, dated October 28, 1879; application filed August 2, 1879.

*To all whom it may concern:*

Be it known that I, JAMES ARKELL, of Canajoharie, in the county of Montgomery and State of New York, have invented an Improved Globe and Machinery and Process for Making the Same; and I do hereby declare that the following is a full and exact description thereof, reference being had to the accompanying drawings, making part of this application.

My invention relates to a novel manufacture of hollow globe or other shaped hollow article designed principally for use in the manufacture of globe-clocks, but adapted to other purposes; also to a novel process or mode of manufacture of such hollow spherical or other shaped articles, and also to a novel machine or apparatus designed for the practicing of said novel process and the production of said novel product or article of manufacture.

My said invention consists, first, as to the product or article of manufacture in a hollow spherical or other shaped article, adapted to be used either for the purposes of a terrestrial or other globe, or as a case or receptacle for any sort of goods, composed of layers of what is known in the art of paper-making as " wet-broke"—that is, the moist or wet and imperfectly-felted together paper-stock just after it leaves the wire cylinder and is passed onto the blanket and before the wet sheet or layer of stock has become smoothed out into a paper-like condition—united under compression, as will be hereinafter more fully described; second, as to the process of making such globes or other articles, my invention consists in forming hemispherical or other shaped sections of the globe or case of layers of wet-broke by placing the layers on one part of a die or mold with intermediate layers of some suitable adhesive substance, then subjecting the series of layers to compression, and then drying them, (either by artificial or natural heat,) all as will be hereinafter more fully described; third, as to the machinery or apparatus for conducting such process, my invention consists in a machine having a male and female die, or having two parts of a mold of the designed shape of the section to be made, adapted to be brought together with the requisite degree of pressure, and having the molding-surface of one of its said dies perforated to permit the escape of the water expressed from the material being operated upon, as will be presently described; and, further, it consists in having the male die made capable of expansion or distention, in a manner and for purposes to be hereinafter explained, and in the combination, with such expansible die, of means for distending it.

To enable those skilled in the art to which the several features of my invention relate to fully understand and practice my invention, I will now proceed to describe it more particularly by reference to the accompanying drawings, forming part of this specification, in which I have so shown the machine and product as to fully illustrate the several parts of my invention.

As the most intelligible idea of the several features of the invention made the subject of this application may be derived from an understanding, first, of the machine; second, of the process carried on by the use of the machine; and, third, of the product resulting from the use of the machine in performing said process, I will describe the said several features in the order just recited.

In the drawings, Figure 1 is a vertical central section of a machine or apparatus made according to the first part of my invention, and showing the parts adjusted in the position or condition necessary to the introduction of the material to be operated upon. Fig. 2 is a partial sectional elevation of the same, (in the same plane of section,) showing the parts differently adjusted; and Fig. 3 is another similar view, showing a still further difference of adjustment, (for purposes to be presently explained.) Fig. 4 is a top view of the perforated expansible male die, and Fig. 5 is a side view of the same; and in the several figures so far enumerated the same parts are designated by the same letters of reference.

Figure 7:
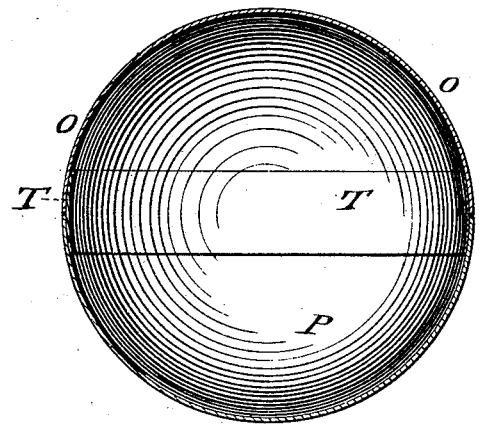

In Figs. 6 and 7 I have shown, respectively in elevation and vertical section, (on an enlarged scale,) a finished globe made according to my invention.

In the several figures, A represents a hollow or shell-like female die, which, by preference, I have heated by steam supplied by a pipe, $a$, the water of condensation being drawn off through a faucet, $b$. This female die A is preferably mounted in an inverted position, as shown, and in the present case is made hemispherical.

B represents a sort of metallic frame-work, composed of vertical rods or posts, as shown, at the upper part of which is mounted the female die A, and the lower part of which is provided with a substantial base, C, to which the posts B are rigidly secured. The said base C has a central vertical hole through it large enough to permit the free passage through it of the main screw-shaft E. This screw-shaft (with its attachments) is supported vertically by a stout hand-wheel, $c$, the hub of which forms a nut to said screw-shaft and rests upon the top surface of the said base or stand C, and said shaft is held laterally by a bearing within a cross-frame, D, the center of which has a hole through it, in which said shaft is free to move in an endwise direction only.

The shaft E has, by preference, a square-threaded screw cut on it, and is splined or grooved longitudinally, as seen at $d$, Fig. 1, for the accommodation of a pin or lug, $e$, that projects inwardly from the hub or bearing portion of cross-frame D, the object and effect of said groove and key being to prevent the shaft E from rotating, and thus enable the rotation of the nut-wheel $c$ to effect the raising and lowering of said shaft, in the manner and for purposes to be presently explained.

To effect the retention in place of the nut-wheel or hand-wheel $c$ vertically, the lower portion of its hub, where it is countersunk in the top of the stand C, is grooved circumferentially, and a pin, $i$, of the stand C projects into said groove. Thus, while the wheel $c$ is free to rotate in either direction, it cannot move vertically, and the screw-shaft E, though it can move up and down, cannot rotate.

On the shaft E, above the cross-frame D, is a nut, $f$, formed at its perimeter something after the fashion of a hand-wheel, as shown, so that it can be readily turned by hand-power, and to the upper end of the hub or central portion of nut $f$ is connected, by means of two or more pins, $g$, projecting inwardly from it, the lower portion of the hub of the device G, which is a sort of follower, and performs the function of expanding the male die, (as will be presently explained,) the connection between said device G and the nut $f$ being a sort of swivel-joint, so that while the nut $f$ is moved up and down by rotation on the screw-shaft E the follower G is free to move up and down with said nut $f$ without rotation, though its connection with the nut is such that it is not prevented thereby from rotating.

H is the male die, which is, in this instance, about hemispherical and adapted to fit into the female die A. This male die H is secured at its center or apex internally to the upper end of the screw-shaft E, as shown, and is made comparatively thin from near its center down to its perimeter, and slitted or cut radially, as seen at 1 2 3, &c., so as to be slightly elastic or expansible, and is perforated with numerous small holes.

When in use the outer surface of this male die H is clothed with a covering of felt or other cloth-like material, $m$.

At Figs. 4 and 5 the male die is represented as having the clothing or felt cover $m$ removed, thus clearly showing the slits or cuts referred to and the perforations, while in the other figures the covering $m$ may be seen on the die, which covering is, by preference, cut in gores, as illustrated at Fig. 2, and thus made to smoothly cover the die after the fashion of a ball-cover.

The function of the felt or other analogous cover $m$ is to prevent the enforcement of the material to be molded on die H into the slits and perforations of said die, and at the same time permit the passage to and through said perforations of the water expressed from the molded material.

In the use of the machine so far described for carrying on my new process, and for the production of my improved hollow molded articles, the operation is as follows, and from a description of its operation will be understood the nature of my new process.

The movable parts of the machine having been adjusted to about the position seen at Fig. 1, or so that the male die H may be readily approached by the operator, a sheet or piece of moist "wet-broke" is laid over the outer surface of the male die H—that is, on top of and covering the felt die-cover $m$. To make the piece of wet-broke fit and lie on properly, it may be gored something like the permanent covering $m$ of the die, and, after placement in position, the exposed surface of the layer is coated over with paste or other adhesive substance. Another layer of the wet-broke, similarly coated with paste, but on both sides, is then placed over the first-applied layer, and so on until four (more or less) layers have been applied, the last-applied layer, however, not having any paste applied to its outer surface.

The male die H is then elevated by turning the hand-wheel nut $c$ until it is forced well up into the female die A, as illustrated at Fig. 2. By this enforcement of the male die H into the female die A, as shown and described, with the requisite degree of pressure, the aggregations of wet-broke layers is compressed into a solid mass, but with a more positive pressure and more solidity at the locality of the topmost portion of the male die than elsewhere, because from the vicinity of the upper ends of cuts 1 2 3, &c., said die is somewhat elastic and collapsible.

This peculiarity of structure and operation of the male die has this effect, viz: that by reason of the capacity of the die to yield slightly any tendency of the material to draw or drag toward the base of the die during its movement into the female die is avoided, and, though the material being molded or compressed is subjected to most pressure at the upper part of the male die, this is desirable, since thereby the maximum pressure is first exerted in line with the line of motion and driving-shaft C, thus insuring the centering of the dies, and the subsequent operation then secures an equality of thickness in the molded shell of material all around the lowermost portions of the die. This subsequent operation is as follows: After the parts shall have been brought into the relation shown at Fig. 2, as just described, the follower G is forced up by turning the hand-wheel nut $f$ until said follower G shall have been forced up sufficiently far into the base portion of die H, as seen at Fig. 3, to expand the said die to an extent sufficient to insure the compression of the material being molded evenly at all points on the surface of said die, and thus produce a hemispherical shell perfectly equal in thickness and density throughout its extent.

Either before the completion of these operations or subsequently the hollow female die A is supplied with steam of the proper temperature, and by the retention of the molded material between the dies for the proper length of time, varying according to the temperature of the female die, the thickness of the shell being made, and other conditions, the molded shell will be properly baked or dried, and the several layers of wet-broke and interposed adhesive material will become a solid mass, capable of exhibiting great cohesive strength and withstanding a great crushing-pressure.

During the molding or compressing and the baking or drying process the water expressed and the products of evaporation all pass readily through the porous covering $m$ and the holes or perforations in the male die H.

I have used steam at about eighty pounds pressure, and have found it necessary to subject the molded mass to the action of the heat from one to four hours to get the best results, according to the temperature and the number of layers of material used, &c. I have used generally from four to six layers of manila "wet-broke," in making shells for time-globes; but the thickness of the article to be produced may of course be varied, and such other conditions, as the temperature of the steam-heated die, &c., must govern the duration of the baking or drying process.

After the removal of the molded shell from the dies, it may have its edge trimmed or turned to make the shell perfectly hemispherical. Two such shells may be then fitted together in any known and desirable manner, either permanently or so as to permit the separation of the parts at pleasure to make a globe or globular case, or receptacle for any desired purpose.

It will be understood that, by the use of the material or substance named, which material is the manila fibrous sheet, which, in the manufacture of paper, is formed on the motion-wires of a paper-making machine, and which, therefore, while like paper in the respect of having the fibers felted together, is, unlike the calendered paper sheet, stretchable or yielding, I am enabled to effect the drawing of the layers over the male die without tearing or wrinkling them, and subsequently compress the aggregated layers into a solid article of perfectly equal thickness and density throughout, and of great tenacity and strength; and it will also be understood that this material which is referred to as "wet-broke," being the moist and unstretched and imperfectly felted stock, and coming off in a crinkled condition, can be stretched and drawn over the molding-dies without tearing, and that this necessary quality does not exist in the stock after it has been passed along in the blanket and between the pressing-rolls, even though it be taken out of the paper-making machine before it shall have reached the rolls, and that therefore the material wet-broke, which is peculiar to my invention, should not be confounded with wet paper, or the web of material just before it has become calendered, and from which, I am aware, it has been common to mold or press hats and other articles in molds or dies.

As represented at Figs. 6 and 7, the finished hemispheres O and P are united by means of an internal band of thin sheet metal, T, which, by preference, is permanently attached during half its width to the part O of the globe, and fits snugly within the other portion, P, as shown best at Fig. 7.

Of course the finished article may be of any other form than that shown, the dies being made to produce any desired shape; and, in lieu of having its halves or parts united as shown at Figs. 6 and 7, may have the parts (either two or more) put together in any other desired manner, either permanently or otherwise, according to the intended uses of the completed article.

In the manufacture of globes from the material named, and in the manner and by machinery described, I have sometimes, after the molding of the shells within the dies, dried them by natural, in lieu of artificial, heat with satisfactory results in the article of manufacture, and I have found a globe (about such as shown) made of four thicknesses of the material named, by the process described, to be capable of withstanding a crushing weight of three hundred or more pounds without showing any deflection of the surface, while at the same time a globe so made will neither dent easily, like a sheet-metal globe, nor be liable to have its surface broken easily by a sudden blow, as in the case of a globe having a plaster-of-paris surface.

For some purposes—such, for instance, as for time-globes or globe-clocks—it is very important to have the shell of the globe of equal weight throughout its extent, and for such purposes my improved manufacture or product is most desirable, since (by reason of the process or mode of manufacture and the principle of operation of the machine used) it possesses a remarkable degree of uniformity of weight throughout. It is also very desirable for many uses, on account of the uniformity of thickness, the quality and extent of its cohesive strength at all points, and because its surface will not check nor crack, as well as for the comparative small cost at which it can be manufactured.

As compared with a globe nine and one-half inches in diameter made of cork, a globe of the same size made according to my invention, and hence much stronger, much more durable, and of greater perfection of shape, will weigh seven and one-half ounces and cost fifty cents, while the cork globe will weigh ten ounces and cost sixteen dollars. A globe can be made of any size according to my invention, while it is impracticable to make cork globes over one foot in diameter.

Of course the machine shown may be varied in many particulars of structure, and may be used somewhat differently than explained without departing from that part of my invention which relates to the apparatus shown and described, and in practicing the process of making the globes or other molded articles variations may be made from the described mode of procedure without materially changing either it or the finished product or article resulting therefrom.

I do not, therefore, wish to be understood as limiting my claims of invention, either as to the machine, the process, or the product, to any such minutiæ or details as may not be essential to my invention; but, Having so fully described my improved product and the process of making the same and the machinery employed as to enable any one skilled in the art to understand and practice the several parts of my invention, what I claim as new, and desire to secure by Letters Patent, is—

1. As a new manufacture, a hollow globe or otherwise shaped case or article, of any desired size, composed of several layers of the material or ingredient known as "wet-broke," united and molded into shape under pressure, as set forth.

2. As an improvement in the art of making hollow articles, such as referred to, molding such articles out of several layers of wet-broke placed over or within a suitable die or mold, and having some adhesive material applied intermediately of said layers, the aggregated layers of wet-broke and adhesive substance being subjected to compression and then dried, substantially as set forth.

3. As to mechanism for molding or shaping the material in the manufacture of articles molded under pressure, the combination of two dies, one having a solid and the other a perforated and radially-slitted face, and the two arranged and operating together substantially as set forth.

4. The combination, with a rigid die, of a die the surface of which is longitudinal at its apex and expansible from its apex toward its perimeter or greatest circumference, in the manner and for the purpose set forth.

5. The combination, with an expansible die, of a follower and means for forcing said follower into said die, all substantially as and for the purpose set forth.

6. In combination with the fixed female die A, the male die H, provided with a screw-shaft, E, and propelling-nut $c$, the whole arranged and operating together as and for the purposes set forth.

7. In combination with the male die H and its screw-shaft E, the follower G and propelling-nut $f$, the whole arranged and operating as and for the purpose set forth.

In testimony whereof I have hereunto set my hand and seal this 10th day of July, 1879.

JAMES ARKELL. [L. S.]

In presence of—
S. E. RICHMOND,
W. N. SMITH.